United States Patent [19]
Baumstark, Jr.

[11] 3,744,721
[45] July 10, 1973

[54] ROTARY SPRINKLER
[76] Inventor: Leopold Baumstark, Jr., 37980 Vineland Avenue, Beaumont, Calif. 92223
[22] Filed: Sept. 10, 1971
[21] Appl. No.: 179,461

[52] U.S. Cl.............. 239/261, 239/253, 239/264, 285/98, 285/281
[51] Int. Cl.......................... B05b 3/06, F16l 17/00
[58] Field of Search................... 239/200, 201, 251, 239/252, 253, 256, 257, 258, 259, 261, 262, 264, 451; 285/98, 281

[56] References Cited
UNITED STATES PATENTS

| | | | |
|---|---|---|---|
| 2,729,474 | 1/1956 | Unger | 285/281 X |
| 2,793,911 | 5/1957 | Dudley | 285/98 |
| 785,871 | 3/1905 | Glazier et al. | 239/253 X |
| 1,180,170 | 4/1916 | Marsh et al. | 239/257 |
| 2,625,411 | 1/1953 | Unger | 285/281 |
| 2,878,062 | 3/1959 | Crow | 239/264 X |
| 3,042,318 | 7/1962 | Crow et al. | 239/251 X |
| 3,333,773 | 8/1967 | Hutchinson | 239/568 X |
| 3,386,662 | 6/1968 | Kennedy et al. | 239/259 |
| 3,532,364 | 10/1970 | Snyder | 285/98 |
| 3,578,361 | 5/1971 | Corrigan | 285/98 |

Primary Examiner—Robert S. Ward, Jr.
Attorney—Peter H. Firsht

[57] ABSTRACT

A sprinkler has a rotary tubular shaft which supports a cross head and nozzle tubes. The shaft is journaled in a housing having a top surface engaged with the undersurface of the cross head when the shaft is stationary. The cross head has a protective skirt for preventing entry of water between the surfaces. Associated with the lower end of the shaft is a combination thrust and radial bearing system and a seal through which water flows and which flexes in response to water pressure to effectively seal the bearing system against the entry of water and to thrust apart the cross head and the housing to make for easier turning and longer life of the sprinkler.

9 Claims, 7 Drawing Figures

PATENTED JUL 10 1973 3,744,721
SHEET 1 OF 2
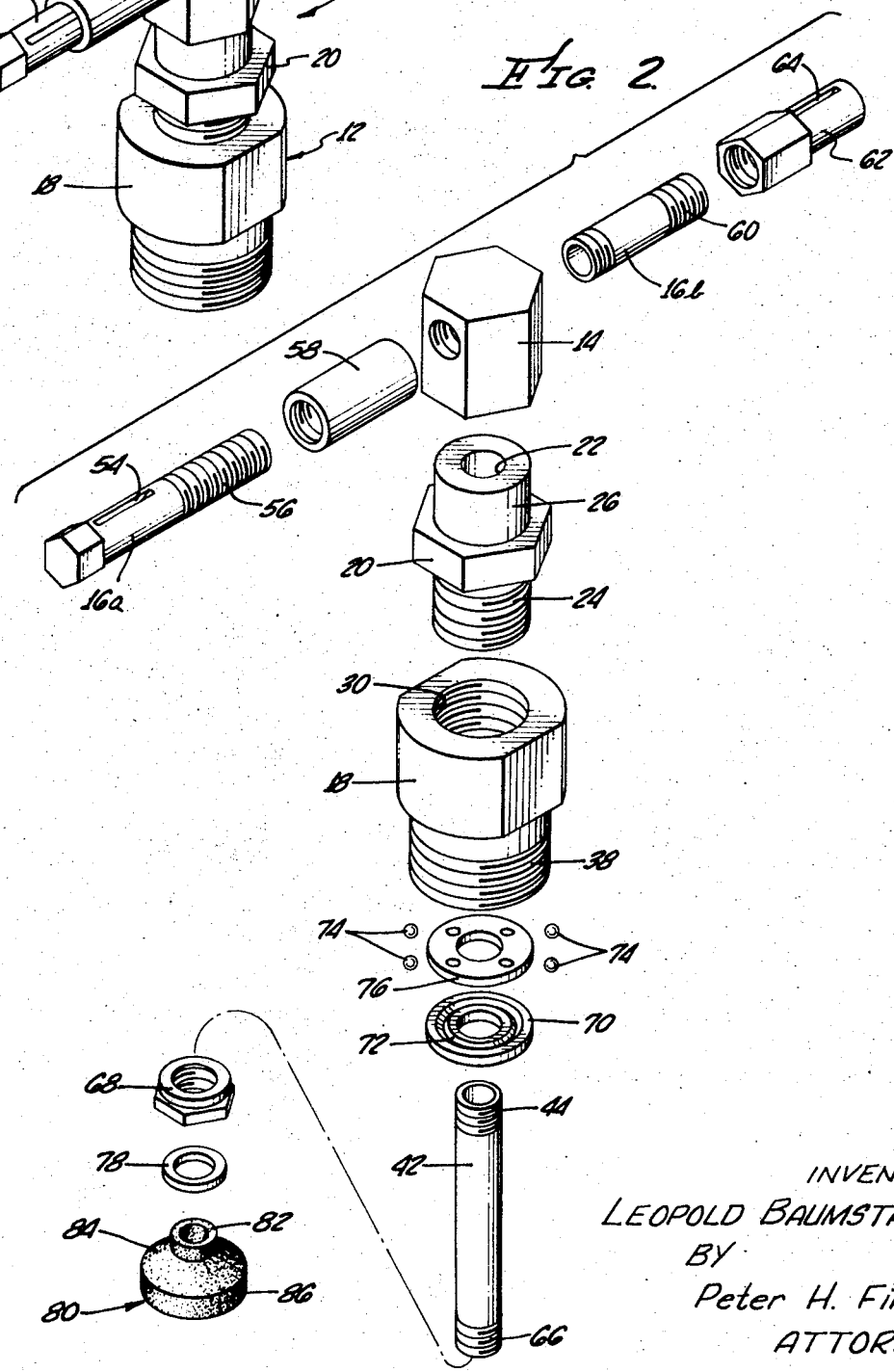
INVENTOR.
LEOPOLD BAUMSTARK, JR.
BY
Peter H. Firsht
ATTORNEY.

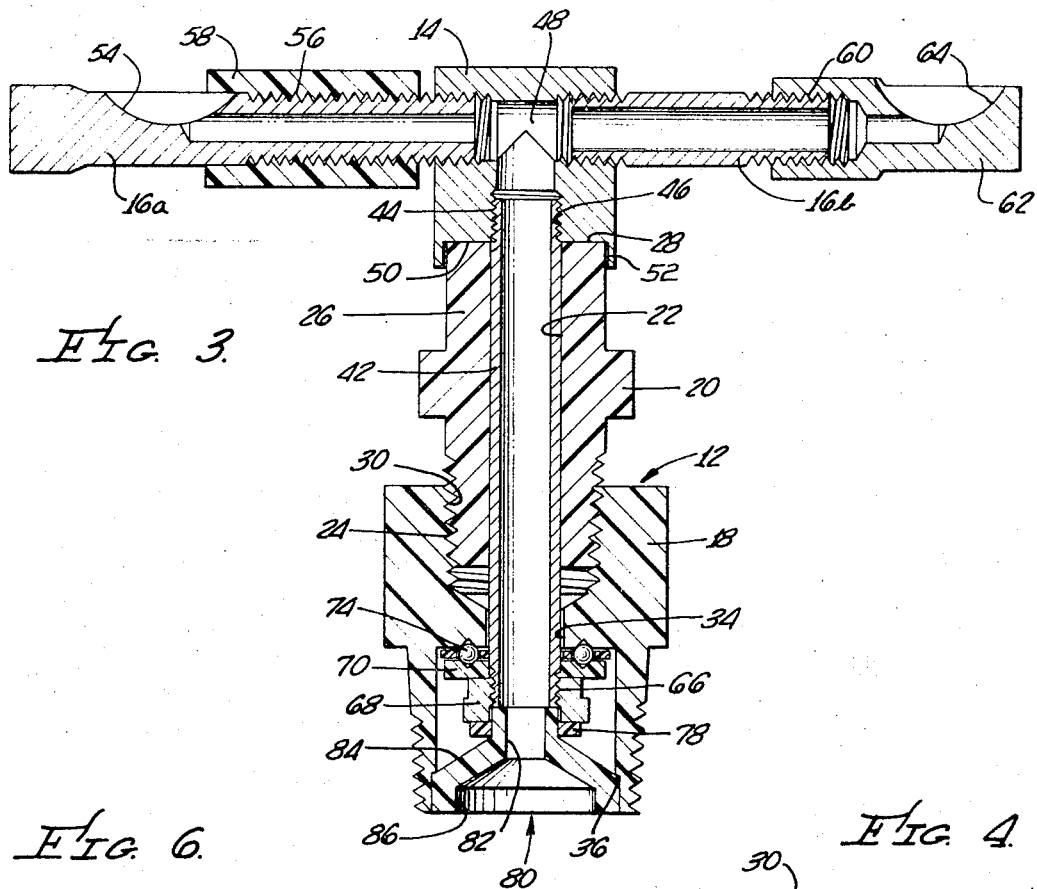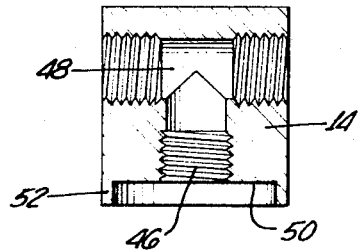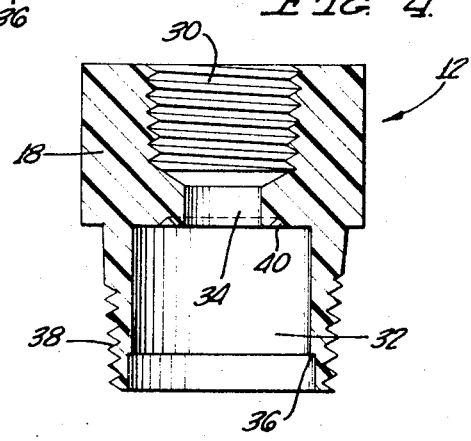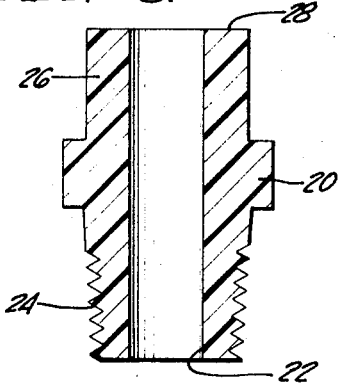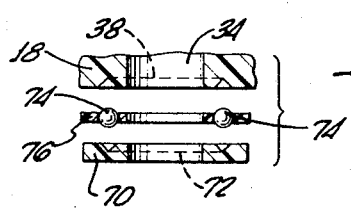

ROTARY SPRINKLER

BACKGROUND OF INVENTION

The present invention relates to sprinklers, and more particularly to a rotary sprinkler having ball bearings to provide for ease of rotation, the ball bearings being protected from water by a diaphragm seal of flexible material seated in a bore and responsive to water pressure for tight seating of the seal.

The prior art includes various forms of rotary sprinklers. All are more or less plagued by the problem of water carrying sand and silt or other foreign matter in between relatively turning parts resulting in friction drag and abrasion with attendant wear and reduction of the life of the sprinkler.

SUMMARY OF INVENTION

A primary object of the present invention is to provide a rotary sprinkler which turns easily and sprays a desired volume of water.

Another object is to provide a rotary sprinkler which has bearing means sealed against the entry of water.

A further object is to provide a rotary sprinkler having bearing means for ease of rotation and a seal between the bearing means and the source of water, the seal being responsive to the pressure of the water for tighter sealing.

Still another object is to provide a rotary sprinkler which has ball bearings and a diaphragm seal of flexible material which flexes in response to water pressure for applying thrust to the bearings.

A still further object is to provide a rotary sprinkler which has ball bearings and a seal which serves as a conduit for water and is responsive to water pressure for effecting a tight seal and applying thrust to the bearings.

Still another object is to provide a rotary sprinkler which has adjustable nozzle means for varying the spray pattern and the volume of water sprayed.

These and other objects and advantages are achieved by the provision of a rotary sprinkler which is designed primarily for the irrigation of groves of trees. Of course, the sprinkler is also useful in other environments, such as gardens, lawns, etc. The sprinkler has a housing with a bore in which a tubular shaft is journaled for rotation, the shaft having a cross head at one end which engages the housing and has a protective skirt. The cross head carries a pair of oppositely directed tubes which are provided with adjustable nozzle means for varying the spray pattern and the volume of water sprayed. Associated with the other end of the tubular shaft are combination radial and thrust bearing means in the form of ball bearings disposed in annular raceways formed in the housing and a plate held in place by a retainer screwed to the shaft. The raceways are V-shaped for permitting dirt and other foreign matter to move away from the ball bearings. Engaging the underside of the retainer is a thrust washer supported on a diaphragm seal of flexible material, which flexes in response to water pressure. The seal has an inner cylindrical portion to which is joined a frustoconical portion with a larger diameter skirt portion. The skirt portion is seated in a second bore in the housing, such bore being defined by a cylindrical wall having a shoulder for preventing downstream movement of the skirt portion. The thrust washer surrounds the inner cylindrical portion of the seal and thrusts the ball bearings and raceways together, which disengages the cross head from the housing when the seal is flexed and makes for easier turning.

The sprinkler of the present invention has the advantages that it turns easily in response to the jet action of the water issuing from the nozzle means and its bearings are protected from the entry of water. Since the water often carries sand, silt or other foreign matter, prevention of its entry into the bearings protects the bearings against the abrasive action thereof, thus reducing wear and prolonging the life of the bearings and the sprinkler.

BRIEF DESCRIPTION OF DRAWINGS

FIG. 1 is a perspective view of a rotary sprinkler embodying the principles of the present invention.

FIG. 2 is an exploded view of the sprinkler parts in perspective.

FIG. 3 is a larger scale vertical sectional view of the sprinkler.

FIGS. 4 and 5 are vertical sectional views of the housing parts.

FIG. 6 is a vertical sectional view of the cross head.

FIG. 7 is an exploded vertical sectional view of the ball bearing system.

DESCRIPTION OF PREFERRED EMBODIMENT

Referring to the drawings, there is shown in FIG. 1 a rotary sprinkler 10 embodying the principles of the present invention and including a housing 12, a rotary cross head 14 and nozzle tubes 16a and 16b. As better seen in FIGS. 2, 3, 4 and 5, the housing consists of a mounting base 18 and a journal portion 20 which has a central bore 22, a lower threaded portion 24 and an upper portion 26 with a flat top 28. The base 18 has an internally threaded bore 30 receiving the threaded portion 24, a large diameter bore 32 and a smaller diameter interconnecting bore 34, all coaxial. The wall of the bore 32 is cylindrical and formed therein is a shoulder 36 for a purpose later appearing. The base also has an externally threaded portion 38, adapted to be connected to a source of pressurized water, and a circular channel 40 with a V-shaped cross section, which serves as a bearing raceway.

Received in the bores 22 and 34 is a cylindrical tubular shaft 42, the upper end of which is provided with an external thread 44 which engages with an internally threaded bore 46 formed in the cross head 14, as shown in FIG. 6. The bore 46 communicates with a cross bore 48 having threaded end portions into which the nozzle tubes 16a and 16b are screwed. The cross head has a flat undersurface 50 and a depending protective rim or skirt 52. The surface 50 is engageable with the flat top surface 28 of the housing portion 26 and the skirt covers these surfaces, as shown in FIG. 3, for protection against the entry of water, sand, silt and other foreign matter.

The nozzle tube 16a is formed with a circular cut orifice 54 and an externally threaded portion 56 which is surrounded by an internally threaded sleeve 58. Turning the sleeve adjusts it lengthwise of the nozzle tube and serves to vary the effective size of the orifice. Also, the nozzle tube can be turned to orient the orifice as desired. The nozzle tube 16b has an externally threaded end portion 60 with which a nozzle head 62 is threadedly engaged. The nozzle head has a circular cut orifice 64 which can be oriented as desired by turning the nozzle head. Thus, the spray pattern and the volume of water sprayed can be varied.

The lower end of the tubular shaft 42 extends below the annular raceway channel 40 in the mounting base 18 and has an external thread 66. Screwed to the thread 66 is a retainer 68 which engages under and supports a raceway plate 70 having a circular raceway channel 72 with a V-shaped cross section like the channel 40 in the mounting base 18, as shown in FIGS. 2 and 7. The raceway channels 40 and 72 receive ball bearings 74 and lubricant therefor, the ball bearings being maintained in spaced relation by means of a race washer 76. The V-shaped cross section of the channels permits dirt or the like to move away from the ball bearings for prolonging the life of the bearing system.

As shown in FIG. 3, the retainer 68 extends below the lower end of the tubular shaft 42 and is engaged by a thrust washer 78. The thrust washer is made of a very slick material, such as graphite impregnated rubber or plastic, or the like, and is supported on a flexible seal 80.

The seal 80 has an inner cylindrical portion 82 which is cross dimensioned substantially similarly to the tubular shaft 42 and is received in the retainer 68 and the thrust washer 78. Diverging downwardly from the portion 82 is a frustoconical portion 84 which is joined to a larger diameter cylindrical skirt or seat portion 86. The portion 86 is seated in the bore 32 under the shoulder 36 in abutting relation thereto. The thrust washer is supported at the juncture of the portions 82 and 84, as shown in FIG. 3.

The seal 80 is made of a suitable material, such as rubber or medium soft neoprene, and acts as a diaphragm, in response to water pressure. This causes the seal to press the thrust washer 78 against the bottom of the retainer 68, forcing the ball bearings 74 and raceway channels 38 and 72 together and disengaging surface 50 from surface 28 for easier rotation of the tubular shaft 42. The water pressure also causes the portions 82 and 86 to seat tightly in the retainer 68 and bore 32, respectively, and effectively seal the bearings 74 against the entry of water. The wall thickness of the seal should be sufficient to keep the seal from "ballooning" under water pressure. The shoulder 36 prevents downstream movement of the portion 86.

It is believed that the operation of the sprinkler of the present invention is clearly apparent and is briefly summarized at this point. When pressurized water is supplied to the sprinkler 10, the water pressure flexes the seal 80, causing the portions 82 and 86 to seat tightly and the thrust washer 78 to move the tubular shaft 42 slightly upwardly and separate the surface 50 on the cross head 14 from the surface 28 on the portion 26 of the housing 12. The water flows through the seal, the shaft 42, the nozzle tubes 16a and 16b, and orifices 54 and 64, causing rotation and spraying.

There has thus been provided a rotary sprinkler which turns easily and has bearing means which are protected against the entry of water by a flexible seal which flexes in response to water pressure for effecting a tight seal and for thrusting relatively moving surfaces apart for easier rotation.

Although the present invention has been herein shown and described in considerable detail in what is believed to be the most practical and preferred embodiment thereof, it is to be understood that many variations of the embodiment are possible and that the present invention is not to be limited to such details but is to be considered in its broadest aspects and afforded the full scope of the appended claims.

Having described the invention, what is claimed and desired to be protected by Letters Patent of the United States is:

1. A rotary sprinkler comprising:
   a housing connectable to a source of pressurized water and having a bore;
   a tubular shaft having a central axis disposed coaxially of the bore;
   means mounting the shaft on the housing for rotation including bearing means; and
   resilient sealing means disposed in the bore in sealing engagement therewith between the source of pressurized water and the bearing means for protecting the latter from the former and thereby prolonging the life of the bearing means, the sealing means being responsive to the pressure of the water for increasing the amount of the sealing engagement thereof with the bore, said sealing means having an inner cylindrical portion coaxial with the tubular shaft and a larger diameter cylindrical portion which engages the bore, the cylindrical portions of the sealing means being interconnected by a frustoconical portion integral therewith.

2. The sprinkler of claim 1 wherein the sealing means is made of a resilient material which flexes in response to water pressure to thrust the tubular shaft in a downstream direction.

3. The sprinkler of claim 2 wherein said bore is defined by a cylindrical wall having a shoulder, said shoulder engaging the sealing means at the juncture of the frustoconical and larger diameter portions of the sealing means for preventing movement of said larger diameter portion downstream and effecting tighter sealing engagement in response to said water pressure.

4. The sprinkler of claim 2 wherein a thrust washer surrounds said inner cylindrical portion of the sealing means at its juncture with the frustoconical portion.

5. The sprinkler of claim 4 wherein said bearing means include ball bearings disposed between the thrust washer and the housing.

6. The sprinkler of claim 5 wherein the ball bearings are disposed in an annular raceway having a V-shaped cross section for permitting dirt and other foreign matter to gravitate away from the ball bearings.

7. The sprinkler of claim 4 wherein said housing has a second bore in which said tubular shaft is journaled, means on one end of the shaft limiting longitudinal movement thereof in one direction, said bearing means being associated with the other end of the shaft and limiting longitudinal movement thereof in the other direction, said bearing means including ball bearings disposed partially in an annular raceway formed in the housing and partially in an annular raceway in a plate surrounding the tubular shaft, and a retainer secured to said other end of the shaft holding said plate in place, said retainer being engaged by the thrust washer.

8. The sprinkler of claim 1 wherein said housing has a second bore in which said tubular shaft is journaled, a cross head secured to one end of the shaft and engageable with the housing, said bearing means being associated with the other end of the shaft and including ball bearings disposed in raceways formed in the housing and a plate held in place by a retainer secured to the other end of the tubular shaft, a thrust washer engaging said retainer, said sealing means having a central cylinder portion to which is joined a divergent frustoconical portion having a cylindrical skirt sealingly engaged with said first-named bore, said thrust washer surrounding said central cylindrical portion of the sealing means, said sealing means flexing in response to water pressure and thrusting the tubular shaft in a downstream direction and disengaging said cross head from the housing, and said first-named bore being defined by a cylindrical wall having a shoulder engaged with the sealing means at the juncture of the skirt and frustoconical portion thereof for preventing movement of the skirt downstream.

9. The sprinkler of claim 8 wherein said cross head supports a pair of oppositely directed tubes, and adjustable nozzle means mounted on the tubes for varying the spray pattern and the amount of water sprayed.

* * * * *